US012762438B2

(12) United States Patent
Myers et al.

(10) Patent No.: US 12,762,438 B2
(45) Date of Patent: Oct. 13, 2026

(54) AUTONOMOUS SYSTEM ACTION EXPLANATION

(71) Applicant: SRI International, Menlo Park, CA (US)

(72) Inventors: Karen Myers, Menlo Park, CA (US); Melinda Gervasio, Mountain View, CA (US)

(73) Assignee: SRI International, Menlo Park, CA (US)

( * ) Notice: Subject to any disclaimer, the term of this patent is extended or adjusted under 35 U.S.C. 154(b) by 730 days.

(21) Appl. No.: 16/224,360

(22) Filed: Dec. 18, 2018

(65) Prior Publication Data

US 2020/0193311 A1 Jun. 18, 2020

(51) Int. Cl.

*G06N 5/045* (2023.01)
*B25J 13/06* (2006.01)
*G06F 30/20* (2020.01)
*G06F 3/14* (2006.01)
*G06F 111/10* (2020.01)

(52) U.S. Cl.

CPC .............. *G06N 5/045* (2013.01); *B25J 13/06* (2013.01); *G06F 30/20* (2020.01); *G06F 3/14* (2013.01); *G06F 2111/10* (2020.01)

(58) Field of Classification Search

None
See application file for complete search history.

(56) References Cited

U.S. PATENT DOCUMENTS

| | | | | |
|---|---|---|---|---|
| 9,511,767 | B1 * | 12/2016 | Okumura | G08G 1/09626 |
| 9,536,191 | B1 | 1/2017 | Arel et al. | |
| 9,558,176 | B2 | 1/2017 | Tur et al. | |
| 10,372,130 | B1 * | 8/2019 | Kaushansky | B60W 60/001 |
| 10,523,342 | B1 | 12/2019 | Kuzdeba et al. | |

(Continued)

FOREIGN PATENT DOCUMENTS

| | | |
|---|---|---|
| CN | 105260561 A | 1/2016 |
| CN | 106683672 A | 5/2017 |

(Continued)

OTHER PUBLICATIONS

Gersavio et al., "Explanation to Avert Surprise," Explainable Smart Systems Workshop (ExSS) at ACM IUI 2018, Toyko, Japan, Mar. 2018, 4 pp.

(Continued)

*Primary Examiner* — Henry Orr
(74) *Attorney, Agent, or Firm* — Shumaker & Sieffert, P.A.

(57) ABSTRACT

Techniques are disclosed for a self-reflection layer of an autonomous system that improves trust and collaboration with a user by identifying actions of the autonomous system that may be unexpected to the user. In one example, an autonomous system determines actions for one or more tasks. A self-reflection unit generates a model of a behavior of the autonomous system. The self-reflection identifies, based on the model, one or more actions of the actions for the tasks that may be unexpected to the user. The self-reflection unit determines, based on the model, a context and a rationale for the actions. An explanation unit outputs, for display, an explanation for the actions comprising the context and the rationale for the actions to improve trust and collaboration with the user of the autonomous system.

10 Claims, 5 Drawing Sheets

(56) References Cited

U.S. PATENT DOCUMENTS

| | | | | |
|---|---|---|---|---|
| 2003/0233569 | A1* | 12/2003 | Geib | G06F 21/316 726/22 |
| 2005/0054381 | A1* | 3/2005 | Lee | H04M 1/72448 455/557 |
| 2006/0106743 | A1* | 5/2006 | Horvitz | G06N 7/01 706/21 |
| 2007/0016464 | A1* | 1/2007 | Yen | G06Q 90/00 705/301 |
| 2009/0307162 | A1* | 12/2009 | Bui | G06N 5/022 706/54 |
| 2010/0023307 | A1 | 1/2010 | Lee et al. | |
| 2010/0106603 | A1 | 4/2010 | Dey et al. | |
| 2010/0179689 | A1* | 7/2010 | Lin | G05B 19/4202 700/250 |
| 2013/0173504 | A1* | 7/2013 | Tu | G06N 20/00 706/12 |
| 2013/0186258 | A1 | 7/2013 | Tanaka | |
| 2014/0052680 | A1* | 2/2014 | Nitz | G06N 5/04 706/46 |
| 2014/0330479 | A1 | 11/2014 | Dolgov et al. | |
| 2016/0381067 | A1* | 12/2016 | Galula | H04L 63/1416 726/23 |
| 2017/0200061 | A1 | 7/2017 | Julian et al. | |
| 2017/0286844 | A1* | 10/2017 | El Mernissi | G06F 16/90335 |
| 2017/0318035 | A1 | 11/2017 | Baughman et al. | |
| 2018/0072323 | A1* | 3/2018 | Gordon | B60W 30/095 |
| 2018/0107770 | A1* | 4/2018 | Cahoon | G06F 30/15 |
| 2018/0165603 | A1 | 6/2018 | Van Seijen et al. | |
| 2018/0174457 | A1 | 6/2018 | Taylor | |
| 2018/0217601 | A1* | 8/2018 | Marcoux | G06Q 30/06 |
| 2018/0253512 | A1 | 9/2018 | Green | |
| 2018/0260700 | A1 | 9/2018 | Nagaraja | |
| 2019/0011898 | A1 | 1/2019 | Saeki | |
| 2019/0026475 | A1 | 1/2019 | Carroll et al. | |
| 2019/0049267 | A1 | 2/2019 | Huang | |
| 2019/0113973 | A1 | 4/2019 | Coleman et al. | |
| 2019/0147371 | A1* | 5/2019 | Deo | G06N 3/09 706/12 |
| 2019/0155940 | A1* | 5/2019 | Lecue | G06Q 10/04 |
| 2019/0171187 | A1 | 6/2019 | Cella et al. | |
| 2019/0236458 | A1 | 8/2019 | Taylor et al. | |
| 2019/0244133 | A1 | 8/2019 | Nakada et al. | |
| 2019/0310654 | A1* | 10/2019 | Halder | B60W 60/00 |
| 2019/0335006 | A1 | 10/2019 | George et al. | |
| 2019/0347363 | A1 | 11/2019 | Kishimoto et al. | |
| 2019/0384292 | A1 | 12/2019 | Aragon et al. | |
| 2020/0026265 | A1* | 1/2020 | Gocev | G06N 5/003 |
| 2020/0043358 | A1 | 2/2020 | Lee et al. | |
| 2020/0062262 | A1 | 2/2020 | Kusari et al. | |
| 2020/0065128 | A1 | 2/2020 | Nag et al. | |
| 2020/0065670 | A1 | 2/2020 | Nag et al. | |
| 2020/0132479 | A1* | 4/2020 | Khasis | G06Q 10/047 |
| 2020/0134442 | A1 | 4/2020 | Sim et al. | |
| 2020/0134484 | A1* | 4/2020 | Hazard | G06N 5/045 |
| 2020/0150672 | A1 | 5/2020 | Naghshvar et al. | |
| 2020/0151598 | A1* | 5/2020 | Hazard | G05D 1/0088 |
| 2020/0175367 | A1* | 6/2020 | Shafto | G06N 3/0472 |
| 2020/0189603 | A1 | 6/2020 | Yeh et al. | |
| 2020/0192370 | A1 | 6/2020 | Devasia | |
| 2020/0193311 | A1 | 6/2020 | Myers et al. | |
| 2020/0285204 | A1 | 9/2020 | Iwane et al. | |
| 2020/0285208 | A1 | 9/2020 | Okawa et al. | |
| 2020/0311556 | A1 | 10/2020 | Francon et al. | |
| 2020/0320435 | A1 | 10/2020 | Sequeira et al. | |
| 2020/0344565 | A1 | 10/2020 | Lee et al. | |
| 2020/0364567 | A1 | 11/2020 | Oh et al. | |
| 2021/0019644 | A1 | 1/2021 | Kim et al. | |

FOREIGN PATENT DOCUMENTS

| | | | |
|---|---|---|---|
| CN | 108427765 | A | 8/2018 |
| CN | 109242041 | A | 1/2019 |
| JP | 2007052589 | A | 3/2007 |
| KR | 102173579 | B1 | 11/2020 |
| WO | 2009056416 | A1 | 5/2009 |
| WO | 2016094862 | A2 | 6/2016 |
| WO | 2018123606 | A1 | 7/2018 |
| WO | 2019052810 | A1 | 3/2019 |
| WO | 2022195494 | A1 | 9/2022 |

OTHER PUBLICATIONS

Gersavio et al., "Explanation to Avert Surprise," Poster Presentation in Workshops on Explainable Smart Systems (ExSS) at ACM IUI 2018, Toyko, Japan, Mar. 2018, 1 pp.

Lombrozo, Simplicity and probability in causal explanation. Elsevier; Cognitive Psychology, vol. 55, Issue 3, Nov. 2007, pp. 232-257.

Abbeel et al., "Apprenticeship Learning via Inverse Reinforcement Learning," ICML '04: Proceedings of the twenty-first International Conference on Machine Learning, Jul. 2004, 8 pp.

Oliehoek et al., "Exploiting Locality of Interaction in Factored Dec-POMDPs," Proc. of 7th Int. Conf. on Autonomous Agents and Multiagent Systems (AAMAS 2008), May 12-16, 2008, pp. 517-524.

Ribeiro et al., "Why Should I Trust You?": Explaining the Predictions of Any Classifier KDD '16 Proceedings of the 22nd ACM SIGKDD International Conference on Knowledge Discovery and Data Mining, Aug. 13-17, 2016, 10 pp.

Yeh et al., "Bridging the Gap: Converting Human Advice into Imagined Examples," Advances in Cognitive Systems 6, Aug. 2018, 20 pp.

Watkins, "Learning from Delayed Rewards," Ph.D. Dissertation, King's College, May 1989, 241 pp.

Yeh et al., "Inducing rule-like learning in connectionist architectures," Poster Presentation in International Conference on Mathematical Neuroscience, May 24, 2017, 1 pp.

Adomavicius et al., "Improving aggregate recommendation diversity using ranking-based techniques," IEEE Transactions on Knowledge and Data Engineering; 24(5), May 2012, 15 pp.

Berry et al., "The design of a usercentric scheduling system for multifaceted real-world problems," ICAPS'07 Workshop on Moving Planning and Scheduling Systems into the Real World, Sep. 2007, 6 pp.

Berry et al., "Neptune: A Mixed-Initiative Environment for Planning and Scheduling," Proceedings of the Twenty-First International Florida Artificial Intelligence Research Society Conference (FLAIRS 2008), May 15-17, 2008, pp. 573-574.

Cheng et al., "A BIM-based framework for material logistics planning," In: Proc. 23rd Ann. Conf. of the Int'l. Group for Lean Construction. Jul. 29-31, 2015, 10 pp.

Levitt et al., Sightplan: A Blackboard Expert System for Constraint Based Spatial Reasoning about Construction Site Layout. Technical Report No. 20, Stanford University, Oct. 1989, 74 pp.

Marler et al., "Survey of multi-objective optimization methods for engineering," Structural and Multidisciplinary Optimization, 26(6), Mar. 23, 2004, pp. 369-395.

Myers et al., "Generating Qualitatively Different Plans through Metatheoretic Biases," Proc. of 16th National Conference on Artificial Intelligence (AAAI-99), May 1999, 7 pp.

Myers et al., "Policy-based Agent Directability," Chapter 9 in Agent Autonomy, Springer Science+Business Media New York, Mar. 31, 2003, 18 pp.

Myers et al., "A Mixed-initiative Framework for Robust Plan Sketching," Proc. of the 13th International Conference on Automated Planning and Scheduling (ICAPS-03), AAAI, Apr. 2003, pp. 256-265.

Said et al., "Automated multi-objective construction logistics optimization system," Automation in Construction vol. 43, Jul. 2014, pp. 110-122.

Desjardins et al., "DD-Pref: A language for expressing preferences over sets," AAAI, Jan. 2005, pp. 620-626.

Zuluaga et al., "Active learning for multi-objective optimization," ICML'13: Proceedings of the 30th International Conference on International Conference on Machine Learning, vol. 28, Jun. 2013, 9 pp.

(56) References Cited

OTHER PUBLICATIONS

U.S. Appl. No. 62/907,890, by Melinda T. Gervasio et al., filed Sep. 30, 2019.
U.S. Appl. No. 16/222,612, filed Dec. 17, 2018, naming inventors Yeh et al.
Agrawal et al., "Fast Algorithms for Mining Association Rules in Large Databases," In Proceedings of the 20th International Conference on Very Large Data Bases (VLDB '94), Sep. 1994, 32 pp.
Alzantot, "Deep Reinforcement Learning Demysitifed (Episode 2)—Policy Iteration, Value Iteration and Q-learning," Retrieved Aug. 31, 2020 from: https://medium.com/@m.alzantot/deep-reinforcement-learning-demysitifed-episode-2-policy-iteration-value-iteration-and-q-978f9e89ddaa, Jul. 8, 2017, 11 pp.
Amir et al., "Highlights: Summarizing Agent Behavior to People," In Proceedings of the 17th International Conference on Autonomous Agents and Multiagent Systems (AAMAS '18), Jul. 10-15, 2018, 9 pp.
De Graaf et al., "How People Explain Action (and Autonomous Intelligent Systems Should Too)," AAAI 2017 Fall Symposium on Artificial Intelligence for Human-Robot Interaction, Technical Report FS-17-01, Nov. 2017, pp. 19-26.
Dijkstra, "A note on two problems in connexion with graphs," Numer. Math. 1(1), Dec. 1, 1959, pp. 269-271.
Fuglede et al., "Jensen-Shannon Divergence and Hilbert Space Embedding," In Proceedings of the International Symposium on Information Theory (SIT 2004), Jun. 27-Jul. 2, 2004, 6 pp.
Han et al., "Mining Frequent Patterns without Candidate Generation: A Frequent-Pattern Tree Approach," Data Mining and Knowledge Discovery: 8(1), Jan. 1, 2004, pp. 53-87.
Hayes et al., "Improving Robot Controller Transparency Through Autonomous Policy Explanation," In Proceedings of the 2017 ACM/IEEE International Conference on Human-Robot Interaction (HRI '17), Mar. 6-9, 2017, 10 pp.
Jaccard, "The Distribution of the Flora in the Alpine Zone," The New Phytologist:11(2), Feb. 29, 1912, pp. 37-50.
Kaelbling et al., "Planning and acting in partially observable stochastic domains," Artificial Intelligence 101(1), Jan. 17, 1998, pp. 99-134.
Khan et al., "Minimal Sufficient Explanations for Factored Markov Decision Processes," AAAI Press, In Proceedings of the 19th International Conference on International Conference on Automated Planning and Scheduling (ICAPS'09), Sep. 2009, 7 pp.
Knox et al., "Interactively Shaping Agents via Human Reinforcement: The TAMER Framework," ACM, In Proceedings of the Fifth International Conference on Knowledge Capture (K-CAP '09), Sep. 1-4, 2009, 8 pp.
Littman, "Memoryless Policies: Theoretical Limitations and Practical Results," MIT Press, In Proceedings of the Third International Conference on Simulation of Adaptive Behavior : From Animals to Animats 3: vol. 3, Aug. 1994, 8 pp.
Miller, Explanation in artificial intelligence: Insights from the social sciences. Artificial Intelligence: 267, arXiv: 1706.07269, Aug. 15, 2018, 66 pp.
Mulder et al., "Species evenness and productivity in experimental plant communities," OIKOS: 107(1), Oct. 2004, pp. 50-63.
Sequeira et al., An Associative State-Space Metric for Learning in Factored MDPs. Springer Berlin Heidelberg, In Proceedings of the 16th Portuguese Conference on Artificial Intelligence (EPIA 2013); LNAI 8154, Sep. 2013, pp. 163-174.
Sequeira et al., "Interestingness Elements for Explainable Reinforcement Learning through Introspection," IUI Workshops'19, Mar. 20, 2019, 7 pp.
Sequeira et al., "Interestingness Elements for Explainable Reinforcement Learning: Understanding Agents Capabilities and Limitations," arXiv.org: arXiv:1912.09007v1, Dec. 19, 2019, 46 pp.
Sequeira et al., "Real-Time Sensory Pattern Mining for Autonomous Agents," Springer Berlin Heidelberg, In Proceedings of the 6th International Workshop on Agents and Data Mining Interaction (ADMI 2010); LNCS 5980, May 2010, pp. 71-83.
Van der Waa et al., "Contrastive Explanations for Reinforcement Learning in terms of Expected Consequences," arXiv preprint arXiv:1807.08706, Jul. 23, 2018, 6 pp.
Wang et al., "The Impact of POMDP-Generated Explanations on Trust and Performance in Human-Robot Teams," In Proceedings of the 15th International Conference on Autonomous Agents and Multiagent Systems (AAMAS '16), May 9-13, 2016, 9 pp.
Watkins et al., "Technical Note: Q-Learning," Machine Learning; 8(3), May 1, 1992, pp. 279-292.
Nicola et al., "Improvement of PMSM Control Using Reinforcement Learning Deep Deterministic Policy Gradient Agent", 2021 21st International Symposium on Power Electronics (EE), IEEE, Oct. 2021, pp. 1-6.
Song et al., "Memristive Neural Network Based Reinforcement Learning with Reward Shaping for Path Finding", 2018 5th International Conference on Information, Cybernetics, and Computational Social Systems (ICCSS), IEEE, Aug. 2018, pp. 200-205.
Zhong et al., "Deep Actor-Critic Reinforcement Learning for Anomaly Detection", arXiv.1908.10755v1, Aug. 2019, pp. 1-6.
Guertler et al., "Hierarchical Reinforcement Learning with Timed Subgoals", arXiv:2112.031 00, Dec. 6, 2021, 19 pp.
Krajna et al., "Explainability in reinforcement learning: perspective and position", arXiv:2203.11547, Mar. 22, 2022, 18 pp.
Sestini et al. et al., "Policy Fusion for Adaptive and Customizable Reinforcement Learning Agents", 2021 IEEE Conference on Games (CoG), Aug. 17, 2021, 8 pp.
Tao et al., "Spare Parts Inventory Optimization using Multi-Agent Hierarchical Reinforcement Learning", 2022 28th International Conference on Mechatronics and Machine Vision in Practice (M2VIP), Nov. 16, 2022, 6 pp.
Sniezynski et al., "Combining Rule Induction and Reinforcement Learning: An Agent-based Vehicle Routing", 2010 Ninth International Conference on Machine Learning and Applications, Dec. 12, 2010, 6 pp.
Sun et al., "Multi-Agent Reinforcement Learning with Bidding for Automatic Segmentation of Action Sequences", Proceedings Fourth International Conference on MultiAgent Systems, Jul. 10, 2000, 2 pp.
Wada et al., "A study on hierarchical modular reinforcement learning for multi-agent pursuit problem based on relative coordinate states", 2009 IEEE International Symposium on Computational Intelligence in Robotics and Automation—(CIRA), Dec. 15, 2009, 7 pp.
Kato et al., "Reward Function Using Inverse Reinforcement Learning and Fuzzy Reasoning," IEEE, Hachijo Island, Japan, 2020, pp. 1-6, doi: 10.11 09/SCISISIS50064.2020.932271 0. (Year: 2020).
Nasir et al., "Multi-Agent Deep Reinforcement Learning for Dynamic Power Allocation in Wireless Networks," in IEEE Journal on Selected Areas in Communications, vol. 37, No. 10, pp. 2239-2250, Oct. 2019, doi: 10.1109/ JSAC.2019.2933973. (Year: 2019).
Sari et al., "State thresholding to accelerate reinforcement learning," 2014 IEEE 4th International Conference on System Engineering and Technology (ICSET), Bandung, Indonesia, 2014, pp. 1-6, doi: 10.1109/ICSEngT.2014.7111787. (Year: 2014).
Shen et al., "Sequential and Dynamic constraint Contrastive Learning for Reinforcement Learning," 2021 International Joint Conference on Neural Networks (IJCN N), Shenzhen, China, 2021, pp. 1-9, doi: 10.11 09/IJCNN52387.2021.9533984. (Year: 2021).
Li et al., "Cooperative Multi-Agent Reinforcement Learning with Hierarchical Relation Graph under Partial Observability", 2020 IEEE 32nd International Conference on Tools with Artificial Intelligence (ICTAI), Nov. 9, 2020, 8 pp.
Marashi et al., "Automatic reward shaping in Reinforcement Learning using graph analysis", 2012 2nd International eConference on Computer and Knowledge Engineering (ICCKE), Oct. 18, 2012, 6 pp.
Millan-Arias et al., "Reinforcement Learning for UAV control with Policy and Reward Shaping", arXiv:2212.03828v1, Dec. 6, 2022, 9 pp.
Blaas et al., "Smooth Graphs for Visual Exploration of Higher-Order State Transitions", vol. 15, No. 6, IEEE Transactions on Visualization and Computer Graphics, Oct. 2009, 969-976 pp.

(56) References Cited

OTHER PUBLICATIONS

Pascual et al., "Comparing Structure and Dynamics of Transition Graphs by the Symmetric Difference Metric Over an Edge-Filtration", vol. 12, IEEE Access, Jun. 2024, 81030-81046 pp.
Liu et al., "Multi-Agent Federated Reinforcement Learning for Privacy-enhanced Service Provision in Multi-domain Optical Network", 2021 Asia Communications and Photonics Conference (Acp), IEEE, Oct. 2021, 3 pp.
Ningombam, "Multi-Domain Active Learning for Multi-Agent Reinforcement Learning", 2023 IEEE 2nd International Conference on Industrial Electronics: Developments & Applications (ICIDeA), IEEE, Sep. 2023, 112-115 pp.
Saeed et al., "Domain-Aware Multiagent Reinforcement Learning in Navigation", 2021 International Joint Conference on Neural Networks (IJCNN), IEEE, Jul. 2021, 8 pp.
Chen et al., "Continuity and Smoothness Analysis and Possible Improvement of Traditional Reinforcement Learning Methods", 2020 IEEE International Conference on Mechatronics and Automation (ICMA), IEEE, Oct. 13, 2020, 1722-1727 pp.
Lee et al., "Can a reinforcement learning agent practice before it starts learning?", 2017 International Joint Conference on Neural Networks (IJCNN), IEEE, May 14, 2017, 8 pp.
Williams, "On the use of backpropagation in associative reinforcement learning", IEEE 1988 International Conference on Neural Networks, IEEE, Jul. 24, 1988, 263-270 pp.
Chen et al., "Reinforcement Learning on Computational Resource Allocation of Cloud-based Wireless Networks", 2020 IEEE 6th World Forum on Internet of Things (WF-IoT), IEEE, Jun. 2, 2020, 6 pp.
Davoodi et al., "Feature-Based Interpretable Reinforcement Learning based on State-Transition Models", arXiv:2105.07099, May 23, 2021, pp. 301-308.
Shibuya et al., "Suggestion of probabilistic reward-independent knowledge for dynamic environment in reinforcement learning", 2011 International Symposium on Micro-NanoMechatronics and Human Science, Nov. 6, 2011, pp. 140-145.

* cited by examiner

| | 352 | 354 | 356 | 358 |
|---|---|---|---|---|
| | Trigger | Surprise | Expectation | Explanation |
| 302 | Historical deviations | Action differs from past behavior in similar situations | Agent will behave as it has in the past | Acknowledgement of unexpected action |
| 304 | Unusual situations | Atypical action | Normal operation | Information about unusual situation |
| 306 | Human knowledge limitations | (Seemingly) incorrect action | Agent has the same information as the human | Indicate decision criteria |
| 308 | Preference violations | Non-preferred action | Agent will adhere to specified preferences | Acknowledgment of violation with rationale |
| 310 | Indistinguishable effects | Different action | Agent will perform 'obvious' action | Information about equivalent options |
| 312 | Plan deviations | Action contrary to plan | Actions according to plan | Change of plans and rationale |
| 314 | Indirect trajectories | (Seemingly) aimless behavior | Agent will move toward goal | Plan for getting to goal |

FIG. 3

AUTONOMOUS SYSTEM ACTION EXPLANATION

TECHNICAL FIELD

This disclosure generally relates to autonomous systems.

BACKGROUND

An autonomous system is a robot or machine that performs behaviors or tasks with a high degree of autonomy. An autonomous system is typically capable of operating for an extended period of time without human intervention. A typical autonomous system is capable of gathering information about its environment and traversing the environment without human assistance. Further, an autonomous system uses such information collected from the environment to make independent decisions to carry out objectives. Such autonomous systems may be well suited to tasks in fields such as spaceflight, household maintenance, waste water treatment, delivering goods and services, military applications, cyber security, network management, AI assistants, and augmented reality or virtual reality applications.

SUMMARY

In general, the disclosure describes techniques for facilitating identification and explanation of behaviors of an autonomous system that may be perceived as unexpected or surprising to outside, human observers. Such behavior may be perceived as "unexpected" when it conflicts with the human observer's general background knowledge or history of interactions with the autonomous system. Humans judge mistakes by computer systems more harshly than mistakes by other humans. Further, errors in computer systems have a disproportionately large impact on the reliability of the computer system as perceived by humans. This negative impact on trust has particularly significant repercussions for human-machine teams, where the humans' trust in the autonomous systems directly affects how well the humans utilize the autonomous systems. The effect is particularly unfortunate when a human perceives an autonomous system to be misbehaving when in fact the autonomous system is behaving correctly based on conditions unknown to the human. Accordingly, the techniques are disclosed for a self-reflection layer of an autonomous system that explains unexpected behaviors of the autonomous system.

In one example, a computing system includes an autonomous system configured to determine decisions for a task. The system further includes a self-reflection unit configured to generate a model for decisions determined by the autonomous system. Based on the model, the self-reflection unit may identify an action performed or decision determined by the autonomous system for the task that may be perceived as surprising or unexpected to a user. The self-reflection unit determines, based on the model, a context and a rationale for the unexpected action or decision. An explanation unit of the system outputs, for display to a user, an explanation for the unexpected action or decision comprising the at least one of a context and a rationale for the unexpected action or decision to improve trust by a user in the autonomous system.

In one example, this disclosure describes a system for improving trust and collaboration with a user of an autonomous system by identifying actions of the autonomous system that may be unexpected to the user, the system comprising: the autonomous system executing on processing circuitry and configured to interact with the user and to determine actions for one or more tasks; a self-reflection unit executing on the processing circuitry and configured to generate a model of a behavior of the autonomous system; and an explanation unit executing on the processing circuitry and configured to identify, based on the model, one or more actions of the actions for the one or more tasks that may be unexpected to the user, wherein the explanation unit is further configured to determine, based on the model, at least one of a context and a rationale for the one or more actions, and wherein the explanation unit is further configured to output, for display, an explanation for the one or more actions comprising the at least one of the context and the rationale for the one or more actions to improve trust and collaboration with the user of the autonomous system.

In another example, this disclosure a method for improving trust and collaboration with a user of an autonomous system by identifying actions of the autonomous system that may be unexpected to the user, the method comprising: determining, by an autonomous system executing on processing circuitry and configured to interact with the user, actions for one or more tasks; generating, by a self-reflection unit executing on the processing circuitry, a model of a behavior of the autonomous system; identifying, by an explanation unit executing on the processing circuitry and based on the model, one or more actions of the actions for the one or more tasks that may be unexpected to the user; determining, by the explanation unit and based on the model, at least one of a context and a rationale for the one or more actions; and outputting, by the explanation unit and for display, an explanation for the one or more actions comprising the at least one of the context and the rationale for the one or more actions to improve trust and collaboration with the user of the autonomous system.

In another example, this disclosure describes a non-transitory, computer-readable medium comprising instructions, that, when executed, cause processing circuitry of a system comprising an autonomous system to: determine actions for one or more tasks; generate a model of a behavior of the autonomous system; identify, based on the model, one or more actions for the one or more tasks that may be unexpected to the user; determine, based on the model, at least one of a context and a rationale for the one or more actions; and output, for display, an explanation for the one or more actions comprising the at least one of the context and the rationale for the one or more actions to improve trust and collaboration with the user of the autonomous system.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3 is a chart illustrating example aspects of the techniques of the disclosure.

Like reference characters refer to like elements throughout the figures and description.

DETAILED DESCRIPTION

Figure 1:
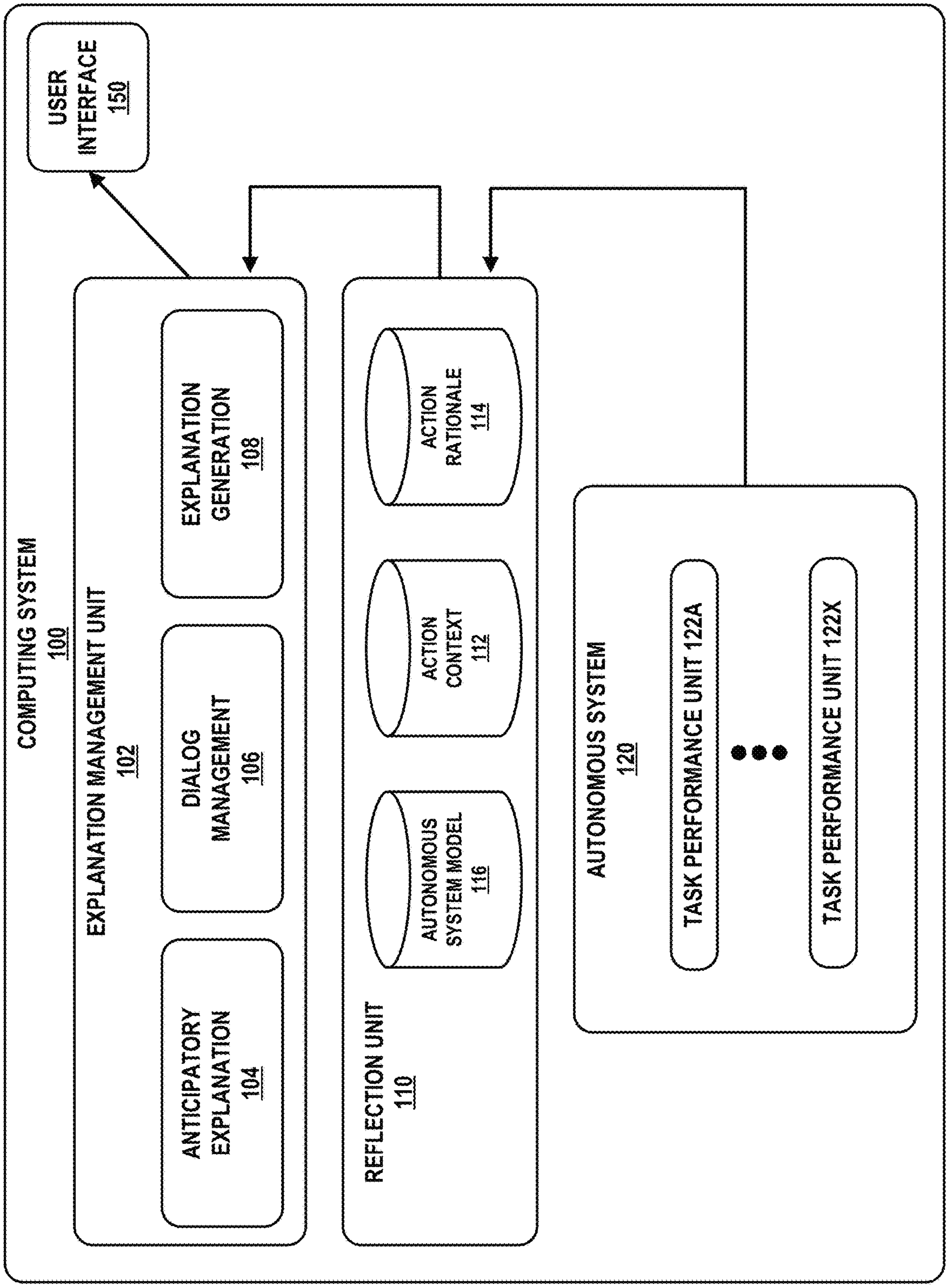
FIG. 1 is a block diagram illustrating an example computing system configured to execute the autonomous system in accordance with the techniques of the disclosure.

An autonomous system may exhibit behavior that appears puzzling to an outside observer. For example, an autonomous system might suddenly change course away from an intended destination. An outside observer may conclude that there was a problem with the autonomous system but, upon further inspection, the autonomous system may have good reason for its action. For example, the autonomous system may be reacting to an unexpected event or diverting to a higher-priority task. A straightforward user interface showing the current plans of the autonomous system may help somewhat to alleviate this problem. However, this may not assist end users who would be teaming with the autonomous system in the future. For example, autonomy will be especially useful in domains that are complex, where the complexity can derive both from a rich, dynamic operating environment (e.g., where the true state of the world is difficult to objectively determine) and a complex set of goals, preferences, and possible actions. For such domains, straightforward user interfaces likely may not help in understanding the rationale for an autonomous agent making a surprising decision.

Conventional explanation schemes are reactive and informational. In other words, in a conventional system, an explanation is provided in response to a human user initiating an explicit request for additional information. For example, a conventional system may provide explanations in response to specific user queries and focus on making the reasoning of an autonomous system more transparent. While reactive explanations are useful in many situations, proactive explanations are sometimes called for, particularly in mixed autonomy settings where, for example, close coordination is required and humans are engaged in tasks of their own or are supervising large teams.

Techniques are disclosed herein for an explanation framework based on explanation drivers, such as the intent or purpose behind autonomous system decisions and actions. The techniques described herein may provide explanations for reconciling expectation violations and may include applying an enumerated set of triggers for triggering proactive explanations. For example, an autonomous system as described herein may generate proactive explanations that anticipate and preempt potential surprises in manner that is particularly valuable to a user. Proactive explanations serve to keep the user's mental model of the decisions made by the autonomous system aligned with the actual decision process of the autonomous system. This minimizes surprises that can distract from and disrupt the team's activities. Used judiciously, proactive explanations can also reduce the communication burden on the human, who will have less cause to question the decisions of the autonomous system. By providing timely, succinct, and context-sensitive explanations, an autonomous system as described herein may provide a technical advantage of avoiding perceived faulty behavior and the consequent erosion of trust, enabling more fluid collaboration between the autonomous system and users.

Explanation for an autonomous system differs in a number of ways. The decision to be explained is typically part of a larger, orchestrated sequence of actions to achieve some long-term goal. Decisions occur at different levels of granularity from overarching policies and strategic decisions down to individual actions. Explanation may be required for various reasons under different circumstances, e.g., before execution to explain planning decisions, during execution to explain deviations from planned or expected behavior, and afterwards to review agent actions.

In a collaborative human-machine team setting, whether humans serve as supervisors or as teammates, explanation during execution presents an additional challenge of limited cognitive resources. With the human already engaged in a cognitively demanding task, system explanations must be succinct, timely, and context-sensitive. In particular, a human may ask for an explanation of the behavior of an autonomous system when the autonomous system has done something unexpected. The autonomous system must provide an explanation that adequately explains the behavior of the autonomous system.

One of the motivations for explanation by an autonomous system is surprise. When an autonomous system violates expectations of a human collaborator (which is typically perceived as undesirable behavior), the human collaborator wants to know the reason why. However, an autonomous system that could anticipate the surprise and proactively explain what the autonomous system is about to do may function better over conventional systems. For example, such an autonomous system that can proactively explain unexpected behavior may avert a potentially unpleasant surprise that distracts the human user and erodes trust. Such unexpected behavior may take the form of a planned action, currently executing action, or action that has previously been executed, that contradicts expectations of the user. As described herein, unexpected "actions" or unexpected "decisions" may be used interchangeably to refer to actions performed by the autonomous system that may be perceived by a user as unexpected or surprising given the user's expectations.

FIG. 1 is a block diagram illustrating an example computing system 100 configured to execute autonomous system 120 in accordance with the techniques of the disclosure. Computing system 100 includes autonomous system 120, reflection unit 110, and explanation management unit 102, and user interface 150. In some examples, computing system 100 includes one or more computing devices interconnected with one another, such as one or more mobile phones, tablet computers, laptop computers, desktop computers, servers, Internet of Things (IoT) devices, autonomous vehicles, robots, etc.

Autonomous system 120 is a robot, machine, or software agent that performs behaviors or tasks with a high degree of autonomy. Autonomous system 120 is capable of operating for an extended period of time without human intervention. In some examples, autonomous system 120 is capable of traversing an environment without human assistance. In some examples, autonomous system 120 includes one or more sensors for collecting information about its environment. Further, autonomous system 120 uses such information collected from the environment to make independent decisions to carry out objectives. In some examples, autonomous system 120 is an autonomous system for an unmanned aerial vehicle (UAV), drone, rover, or self-guided vehicle. In some examples, autonomous system 120 is another type of system that operates autonomously or semi-autonomously, such as a robotic system, healthcare system, financial system, or cybersecurity system.

In the example of FIG. 1, autonomous system 120 includes a plurality of task performance units 122A-122X (collectively, "task performance units 122"). In some examples, each task performance unit 122 performs a discrete task, function, routine, or operation for autonomous system 120. Each of task performance units 122, for example, may implement one or more of task adoption, play selection, plays, parameter instantiation, role allocation, constraint optimization, optimization criteria, route planning, weapons selection, user policies, and/or preference criteria. Such tasks and objectives may take many different forms, such as mapping a particular geographic location or building, attacking a particular target, exploring a particular location, transporting physical goods to a destination, performing sensor measurements in an environment, applying a particular policy, identifying an event, etc. Further, such task performance units 122 may enable autonomous system 120 to assign priorities to each of a plurality of tasks for autonomous system 120, such as to optimize decisions in executing the tasks executed by autonomous system 120. However, the techniques of the disclosure may be implemented on other examples of autonomous system 120 that include similar or different components.

In some examples, task performance units 122 may specify user policies and preference criteria. A human may define policies and preferences to guide the behavior of autonomous system 120. In some examples, the user policies and preference criteria define strict policies and preferences that autonomous system 120 may not violate when carrying out a task or seeking an objective. In other examples, the user policies and preference criteria define soft policies and preferences that autonomous system 120 preferably should not violate when carrying out a task or seeking an objective, but may violate under certain conditions (e.g., to achieve a high-value objective or task).

In accordance with the techniques of the disclosure, computing system 100 includes reflection unit 110. Reflection unit 110 generates model 116 of a behavior of autonomous system 120 that exposes, at least in part, the decision making of autonomous system 120. As described below, model 116 is in turn used by anticipatory explanation unit 104 to identify actions of autonomous system 120 that may be perceived as unexpected or surprising by a user. Autonomous system 120 generates model 116 incrementally in real-time or near real-time, as it operates, by constructing a declarative representation of knowledge, inferences, and decision factors that impact autonomous operation. Model 116 may assume that autonomous system 120 itself is organized around tasks, plays, actions, and roles.

Tasks are the objectives to be performed by autonomous system 120 as part of its autonomous operation. These tasks may be assigned by an external agent (a human, another autonomous system) or autonomous system 120 may determine through its own operation that certain tasks are desirable to achieve.

Plays encode strategies for achieving tasks. Autonomous system 120 may store one or more plays for achieving a given task, which may apply under different conditions or have differing effects. Autonomous system 120 may also have preferences associated with performing certain plays in certain contexts. A given play can be defined hierarchically, eventually grounding out in concrete actions that autonomous system 120 can execute to achieve or work towards a specific task. Plays may include variables that can be set so the plays apply across a broad range of contexts. Autonomous system 120 may specialize a play by selecting context-appropriate values for the play variables so as to execute a play to achieve a specific task for a specific situation.

Actions can either link to effectors of autonomous system 120 that operate in the physical world or can cause changes to the internal state of autonomous system 120, for example, by changing its current set of tasks or modifying its beliefs about the operating environment. Actions may include variables that can be set so that autonomous system 120 may apply the actions across a broad range of contexts. Autonomous system 120 may execute an action by specializing the action through the selection of context-appropriate values for the action variables.

For plays that involve coordinating multiple autonomous systems, roles may exist that are to be filled by one or more autonomous agents, such as autonomous system 120. For example, a play that has a team flying in formation may have a leader role and one or more follower roles. Autonomous system 120 may select a role based on information available to autonomous system 120 or may be assigned a particular role by another actor, such as an external autonomous system or a user.

To generate model 116, autonomous system 120 may provide continuous tracking of several different types of information. For example, autonomous system 120 may track tasks that have been adopted, modified, or dropped, and the rationale for those changes. The rationale may include the source of a task as well as state conditions and other task commitments or dependencies that led to task adoption, modification, or elimination. Autonomous system 120 may additionally track a relevant situational context for achieving those tasks. The rationale may encompass both external state (e.g., factors in the operating environment in which the autonomous system operates) and internal state (e.g., internal settings within the autonomy model, commitments to tasks or actions), along with provenance information for changes in state. Autonomous system 120 may further track plays that were considered for tasks and classification of the plays as unsuitable, acceptable, preferred, or selected, along with rationale for those classifications. The tracked rationale records relevant constraints and preferences associated with plays and their status at the time a play is classified. Autonomous system 120 may further track specializations made to a play to adapt the play to a context in which the play is to be executed. Further, autonomous system 120 may track other autonomous systems that were considered for roles within a play along with an evaluation of their suitability for those roles and rationale for that evaluation. Thus, the rationale may record relevant constraints and preferences associated with the roles along with a status at the time the roles are assigned, as well as a quantitative score evaluating goodness of fit based on evaluation criteria defined within the play. Further, autonomous system 120 may track specific actions that were performed and the rationale for their execution. The rationale may record the play that led to the execution of the action and the higher-level tasks for which that play is being executed along with relevant specializations of the action to the current context.

Reflection unit 110 may further generate, based on model 116, an action context 112 and an action rationale 114 for the action that may be perceived as unexpected by the user. Action context 112 may include information that provides a context for the action made by autonomous system 120 that may be perceived as unexpected by the user. For example, action context 112 may include a summary of information known to autonomous system 120 and used to determine the action that may be perceived as unexpected by the user. Action context 112 may include information related to an operational status of autonomous system 120, a fuel or power status of autonomous system 120, environmental or geographic information, such as terrain obstacles near or remote to autonomous system 120 or routes to a destination, or information related to a target, such as capabilities, location, vector, or defenses of the target, among other types of information used as input for autonomous system decision making.

Action rationale 114 may include information that explains the reasoning that autonomous system 120 used to arrive at the determination to select the action that may be perceived as unexpected by the user. For example, action rationale 114 may include rules, guidelines, directives, requirements, and/or user preferences, as well as route planning, role allocation, and task optimization criteria that, given action context 112, causes autonomous system 120 to determine a decision.

Computing system 100 further includes explanation management unit 102. Explanation management unit 102 includes anticipatory explanation 104, dialog management 106, and explanation generation 108. Explanation management unit 102 outputs, via user interface 150, an explanation for actions identified by reflection unit 110 as being potentially unexpected or surprising to a user. In some examples, the explanation includes at least one of a context and a rationale for the unexpected action.

Explanation management unit 102 uses model 116 to identify the unexpected action in a variety of ways. In anticipation of the surprise by the user, explanation management unit 102 may use anticipatory explanation 104 to generate an anticipatory explanation for the decision designed to anticipate and mollify surprise in the user. For example, anticipatory explanation unit 104 may use model 116 to identify decisions that are historical deviations from past decisions, decisions that arise as a result of unusual situations, decisions that may involve limitations on human knowledge, decisions that violate user preferences, decisions that arise due to multiple choices that have indistinguishable effects, decisions that result in a deviation from a plan, or decisions that result in indirect trajectories to a goal.

Anticipatory explanation unit 104 determines whether an action documented within autonomous system model 116 is likely to be perceived by a user as unexpected or surprising. Upon determining that the action is likely to be perceived as unexpected or surprising, anticipatory explanation unit 104 causes an explanation to be generated and offered proactively to avoid surprise. To determine whether an action is unexpected or surprising, anticipatory explanation unit 104 relies on a set of one or more classifiers. Each classifier determines whether an action is likely to cause surprise in the user. Classifiers represent different classes of surprises and may be manually engineered (e.g., a rule-based classifier, a probabilistic graphical model) or learned (e.g., a decision tree, a linear classifier, a neural net). A classifier receives as input an action, a context for the action, and a rationale for the action (as defined within autonomous system model 116. A classifier outputs a judgment of whether the action is surprising. The judgment may be binary (e.g., surprising/not surprising), ordinal (e.g., very surprising, somewhat surprising, . . . , not at all surprising), categorical (e.g., surprising to novices/experts/everyone, never/sometimes/always), probabilistic (n % probability of being surprising), etc. Given an assessment of sufficient surprise (e.g., upon determining that a probability that the action may cause surprise in the user exceeds a threshold), anticipatory explanation unit 104 generates an explanation drawing on the information in autonomous system model 116, action context 112, and action rationale 114.

In anticipation of the surprise by the user, explanation management unit 102 may generate an anticipatory explanation for the decision designed to anticipate and mollify surprise in the user. Explanation management unit 102 uses explanation generation unit 108 and dialog management unit 106 to craft explanations of actions that may be perceived as unexpected for display to the user. Explanation generation unit 108 may generate the explanations of actions that may be perceived as unexpected as well as the context and a rationale for the action that may be perceived as unexpected by the user. Dialog management unit 106 may include software structures for crafting coherent messages to the user. Dialog management unit 106 processes the explanations generated by explanation generation unit 108 to generate messages that are understandable by a human operator.

User interface 150 is configured to output, for display to a user, the explanation received from explanation management unit 102. In some examples, user interface 150 is or otherwise includes a workstation, a keyboard, pointing device, voice responsive system, video camera, biometric detection/response system, button, sensor, mobile device, control pad, microphone, presence-sensitive screen, network, or any other type of device for detecting input from a human or machine. In some examples, user interface 150 further includes a display for displaying an output to the user. The display may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, user interface 150 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, user interface 150 may include a presence-sensitive display that may serve as a user interface device that operates both as one or more input devices and one or more output devices.

In some examples, explanation management unit 102 uses surprise as the primary motivation for proactivity. For example, explanation management unit 102 may use potential expectation violations to trigger an explanation. To identify expectation violations, explanation management unit 102 may generate a model to model the expectations of the user and the behavior of autonomous system 120. However, instead of relying on a comprehensive formal model of the human's expectations based on a representation of team and individual goals, communication patterns, etc., explanation management unit 102 may identify classes of expectations based on the simpler idea of expectation norms. That is, given a cooperative team setting where the humans and autonomous system 120 have the same objectives, explanation management unit 102 determines expectations of the behavior of autonomous system 120 based on rational or commonsense reasoning. Explanation management unit 102 may use a set of triggers to determine when a proactive explanation is warranted. Further, explanation management unit 102 may discuss, for each trigger, the manifestation of surprise, the expectation violation underlying the surprise, and the information that the proactive explanation should impart. The triggers described herein are not an exhaustive list but include a broad range that may be useful for providing proactive explanations.

The techniques of the disclosure may be used in various explainable autonomy formulations. In one example where autonomous system 120 selects, instantiates, and executes plays from a pre-determined mission playbook, reflection unit 110 may identify surprising role allocations based on assignment to suboptimal resources and use degree of suboptimality to drive proactivity. In another example where autonomous system 120 is a reinforcement learner that acquires policies to determine its actions, reflection unit 110 may use sensitivity analyses that perturb an existing trajectory to identify points where relatively small changes in action lead to very different outcomes.

The techniques of the disclosure may in this way present a framework for explanation drivers, focusing in particular on explanations for reconciling expectation violations. An autonomous system may avert surprise in a human operator by providing an explanation and using an enumerated set of triggers for proactive explanations. The techniques of the disclosure may provide explanations that enable the appropriate and effective use of intelligent autonomous system in mixed autonomy settings.

Accordingly, the techniques of the disclosure may provide the technical advantage of enabling a system to identify and output an explanation for autonomous system behavior, which may improve an ability of a system to facilitate trust for a user in the decisions made by an autonomous system by identifying decisions of the autonomous system that may be unexpected to the user and present a context and a rationale for the action that may be perceived as unexpected by the user. In this fashion, the techniques of the disclosure may increase the transparency of decisions made by the autonomous system to the user such that the user may have confidence that the autonomous system is making rational, informed, and optimized decisions, as opposed to decisions due to incomplete or incorrect information or due to defects or misbehavior of the autonomous system. Thus, the techniques of the disclosure may enable increased trust by the user in an autonomous system, enabling the greater perception of reliability of autonomous systems and more widespread adoption of such systems.

Figure 2:
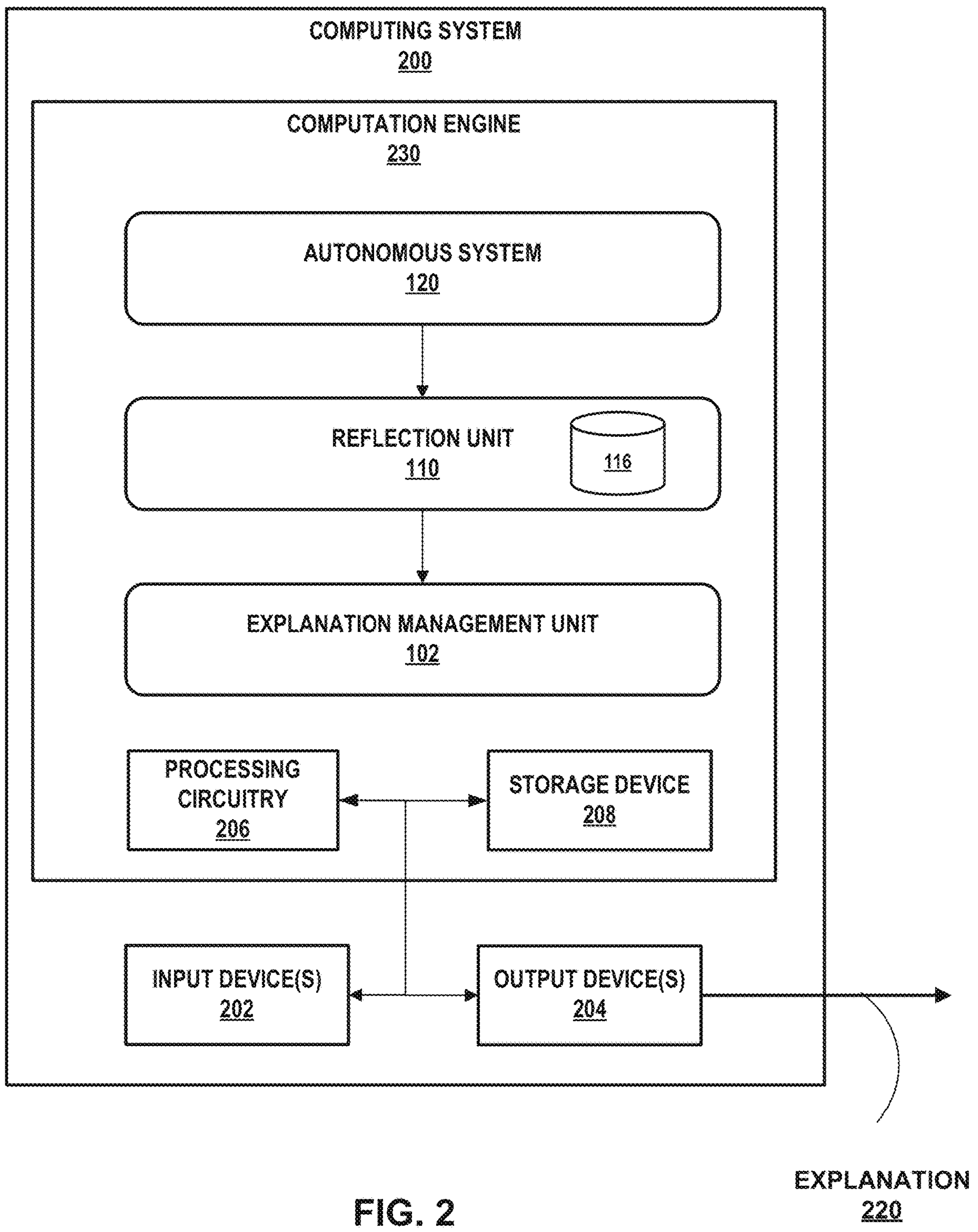
FIG. 2 is a block diagram illustrating an example computing system configured to execute the autonomous system of FIG. 1.

FIG. 2 is a block diagram illustrating an example computing system 200 configured to execute the autonomous system of FIG. 1 in accordance with the techniques of the disclosure. In the example of FIG. 2, computing system 200 includes computation engine 230, one or more input devices 202, and one or more output devices 204. In some examples, computing system 200 includes one or more computing devices interconnected with one another, such as one or more mobile phones, tablet computers, laptop computers, desktop computers, servers, Internet of Things (IoT) devices, autonomous vehicles, robots, etc.

In the example of FIG. 2, computing system 200 may provide user input to computation engine 230 via one or more input devices 202. A user of computing system 200 may provide input to computing system 200 via one or more input devices 202, which may include a keyboard, a mouse, a microphone, a touch screen, a touch pad, or another input device that is coupled to computing system 120 via one or more hardware user interfaces.

Input devices 202 may include hardware and/or software for establishing a connection with computation engine 230. In some examples, input devices 202 may communicate with computation engine 230 via a direct, wired connection, over a network, such as the Internet, or any public or private communications network, for instance, broadband, cellular, Wi-Fi, and/or other types of communication networks, capable of transmitting data between computing systems, servers, and computing devices. Input devices 202 may be configured to transmit and receive data, control signals, commands, and/or other information across such a connection using any suitable communication techniques to receive the sensor data. In some examples, input devices 202 and computation engine 230 may each be operatively coupled to the same network using one or more network links. The links coupling input devices 202 and computation engine 230 may be wireless wide area network link, wireless local area network link, Ethernet, Asynchronous Transfer Mode (ATM), or other types of network connections, and such connections may be wireless and/or wired connections.

Computation engine 230 includes autonomous system 120, reflective unit 110, and explanation management unit 102. Each of components 120, 110, and 102 may operate in a substantially similar fashion to the like components of FIG. 1. Computation engine 230 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry. Storage device 208 may include memory, such as random-access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

In some examples, reflective unit 110 and/or explanation management unit 102 may be located remote from autonomous system 120. For example, autonomous system 120 may include telemetry to upload telemetry data via a wireless communication link to a cloud-based or other remote computing system 200 that models a behavior of autonomous system 120, identifies actions of autonomous system 120 that may be perceived as unexpected, and generates an explanation for the actions that may be perceived as unexpected using the techniques described above.

In some examples, reflective unit 110 of computing system 100 generates model 116 of a behavior of autonomous system 120. Explanation management unit 102 identifies, based on model 116, an action determined by autonomous system 120 for a task that may be perceived as unexpected by the user. For example, explanation management unit 102 may use model 116 to identify decisions that are historical deviations from past decisions, decisions that arise as a result of unusual situations, decisions that may involve limitations on human knowledge, decisions that violate user preferences, decisions that arise due to multiple choices that have indistinguishable effects, decisions that result in a deviation from a plan, or decisions that result in indirect trajectories to a goal.

Explanation management unit 102 determines, based on model 116, a context or a rationale for the action that may be perceived as unexpected by the user. The decision context may include information that provides a context for the action determined by autonomous system 120 that may be perceived as unexpected by the user. For example, the decision context may include a summary of information known to autonomous system 120 and used to determine the action that may be perceived as unexpected by the user. The decision context may include information related to an operational status of autonomous system 120, a fuel or power status of autonomous system 120, environmental or geographic information, such as terrain obstacles near or remote to autonomous system 120 or routes to a destination, or information related to a target, such as capabilities, location, vector, or defenses of the target.

The decision rationale may include information that explains the reasoning that autonomous system 120 used to arrive at the action that may be perceived as unexpected by the user. For example, the decision rationale may include rules, guidelines, directives, requirements, and/or user preferences, as well as route planning, role allocation, and task optimization criteria that, given action context 112, caused autonomous system 120 to arrive at the action that may be perceived as unexpected by the user.

Explanation management unit 102 uses explanation generation unit 108 and dialog management unit 106 to generate explanation 220 of the action that may be perceived as unexpected for the user. For example, explanation management unit may output, for display via an output device 204, an explanation 220 for the unexpected action. As another example, explanation management unit 102 may generate explanation 220 and store, via output devices 204, explanation 220 to a storage device. Explanation 220 may represent text or a graphical symbol, a sound, audio, text file, a tactile indication, or other indication that at least partially explains a decision of autonomous system 120. In some examples, explanation 220 includes the context or the rationale for the unexpected action.

Output device 204 may include a display, sound card, video graphics adapter card, speaker, presence-sensitive screen, one or more USB interfaces, video and/or audio output interfaces, or any other type of device capable of generating tactile, audio, video, or other output. Output device 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 204 may include a presence-sensitive display that may serve as a user interface device that operates both as one or more input devices and one or more output devices.

FIG. 3 is a chart illustrating example aspects of the techniques of the disclosure. For convenience, FIG. 3 is discussed with respect to system 100 of FIG. 1. FIG. 3 illustrates, for example, an unexpected action 352 of autonomous system 120 that triggers a proactive explanation, a surprise 354 the unexpected action causes to a human user, an expectation 356 of the human user, and a proactive explanation 358 that explanation management unit 102 may provide to the user to mitigate the surprise.

The example of FIG. 3 provides examples of manually engineered classifiers for anticipatory explanation. For example, a classifier of anticipatory explanation unit 104 for the surprise because of a non-preferred action may be a set of rules that the agent uses to infer what would have been chosen from the available actions (decision context) had it applied the user's specified preferences (autonomous system model). Anticipatory explanation unit 104 decides that the decision or action will be a surprise if it is different from this expectation. In this case, anticipatory explanation unit 104 identifies the reasons behind the decision (e.g., a decision rationale). Explanation management unit 102 includes the reasons in an explanation that acknowledges the violated preference and provides the rationale for the decision of autonomous system 120.

As discussed briefly above, explanation management unit 102 may use the model of a behavior of autonomous system 120 to identify actions of autonomous system 120 that may be perceived as unexpected by a user. For example, explanation management unit 102 may use the model to identify specific triggers that warrant a proactive explanation, such as decisions that are historical deviations from past decisions, decisions that arise as a result of unusual situations, decisions that may involve limitations on human knowledge, decisions that violate user preferences, decisions that arise due to multiple choices that have indistinguishable effects, decisions that result in a deviation from a plan, or decisions that result in indirect trajectories to a goal.

With respect to decisions that are historical deviations 302 from past decisions, an important aspect of trust is predictability. A human generally expects autonomous system 120 to perform actions that are similar to what the autonomous system 120 has performed in comparable situations in the past. Thus, if autonomous system 120 executes an action that is different than an action that autonomous system 120 has performed in similar past situations, the action is likely to surprise the user. Explanation management unit 102 may anticipate this situation through a combination of statistical analysis of performance logs and semantic models for situation similarity. Explanation management unit 102 may generate an explanation that acknowledges the atypical behavior and provides the rationale behind it. An example explanation may be "Aborting rescue mission because of engine fire."

With respect to decisions that arise as a result of unusual situations 304, a human observer lacking detailed understanding of an environment may be aware of actions for normal operations but not of actions for more unusual situations. The actions of autonomous system 120 in such unusual situations may thus surprise a user. Explanation management unit 102 may identify these unusual situations by their frequency of occurrence. For example, if the conditions that triggered the behavior are below a probability threshold, explanation management unit 102 may identify the behavior as arising as a result of an unusual situation. To avert surprise to the user, explanation management unit 102 may generate an explanation that describes the unusual situation. An example explanation may be "Normal operation is not to extinguish fires with civilians on board, but fire is preventing egress of Drone 17 with a high-priority evacuation."

With respect to decisions that may involve limitations on human knowledge 306, sensing and computational capabilities, particularly in distributed settings, can enable autonomous system 120 to have insights and knowledge that are unavailable to human collaborators. With insufficient information, a human operator may perceive an action taken by the autonomous system as an incorrect one. Through awareness of decisions based on this information, explanation management unit 102 may identify potential mismatches in situational understanding that can lead to surprising the user with seemingly incorrect decision-making. Explanation management unit 102 may generate an explanation that identifies the potential information mismatch and draws the attention of the user to the information mismatch.

With respect to decisions that violate user preferences 308, in some examples, autonomous system 120 incorporates preferences over desired behaviors. In some examples, these preferences are created by autonomous system 120. In some examples, these preferences are learned by autonomous system 120 over time. In some examples, these preferences are created by a system modeler at the time of design or imposed by a human supervisor later on. When making decisions, autonomous system 120 seeks to satisfy these preferences. However, various factors (e.g., resource limitations, deadlines, physical restrictions) may require violation of the user preferences. In some situations, the user may perceive autonomous system 120 as seemingly operating contrary to plan and thus surprising the user. Explanation management unit 102 may generate an explanation that acknowledges the violated preference or directive and providing a reason why. An example explanation may be "Entering no-fly zone to avoid dangerously high winds."

With respect to decisions that arise due to multiple choices that have indistinguishable effects 310, two actions may be very different in practice but achieve similar effects. For example, different routes to the same destination may have similar duration, and therefore selection one route or the other may have a negligible effect on travel time. However, selecting a particular route may surprise a human observer who may not have realized their comparable effects or even been aware that the selected option was a valid choice. Reflection unit 110 may anticipate this type of surprise by measuring the similarity of multiple actions or trajectories and of corresponding outcomes. Explanation management unit 102 may generate an explanation that informs the user of the different options and their similar impact. An example explanation may be "I will extinguish Fire 47 before Fire 32, but extinguishing Fire 32 before Fire 47 would be just as effective."

With respect to decisions that result in a deviation from a plan 312, a user may expect autonomous system 120 to execute a predetermined plan to achieve a goal. However, situations may arise that require a change of plans which, if initiated by autonomous system 120, may cause surprise in the user. Absent an explicit shared understanding of the current plan, autonomous system 120 may rely on the user to expect inertia, e.g., an expectation that autonomous system 120 will continue moving in the same direction toward the same target. Explanation management unit 102 may characterize this tendency and recognize significant changes so as to anticipate potential surprise in the user. Explanation management unit 102 may generate an explanation that informs the user of the plan change. An example explanation may be "Diverting to rescue newly detected group." The explanation may be sufficient if the explanation calls attention to a new goal or target previously unknown to the user. However, if the change involves a reprioritization of existing goals, explanation management unit 102 may include the rationale. Another example explanation may be "Diverting to rescue Group 5 before Group 4 because fire near Group 5 is growing faster than expected."

With respect to decisions that result in indirect trajectories to a goal 314, a user may expect autonomous system 120 to be engaged in generally purposeful behavior. In spatiotemporal domains, observers may typically infer from a trajectory of autonomous system 120, a destination of autonomous system 120. Further, an observer may assume, based on the perceived destination, a goal of autonomous system 120. For example, a fire response drone heading toward a fire is likely to be planning to extinguish the fire. Surprises occur when autonomous system 120 decides to take an indirect route to a goal and therefore appears to an outside observer to be headed nowhere meaningful. Explanation management unit 102 may identify this situation by determining a difference between an actual destination and an apparent one, if any. Explanation management unit 102 may generate an explanation that explicitly identifies a goal of autonomous system 120 and the reason for the indirect action. An example explanation may be "New task to retrieve equipment from supply depot prior to proceeding to target."

The aforementioned examples of actions of autonomous system 120 that may be perceived as unexpected by a user depicted in FIG. 3 are provided for illustrative purposes only. The techniques of the disclosure may be used to explain these decision types as well as other unexpected behaviors of autonomous system 120 not expressly described herein.

Figure 4:
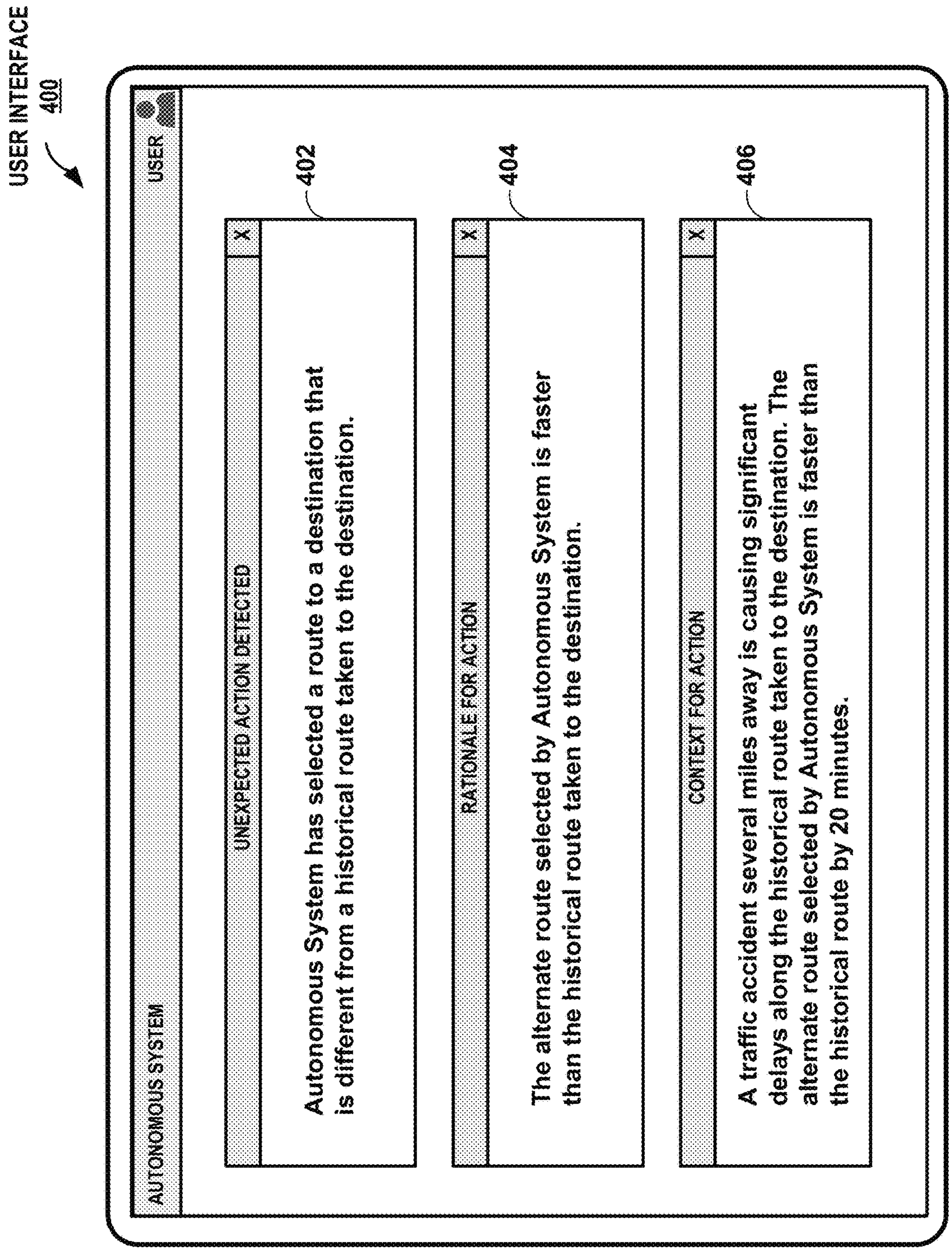
FIG. 4 is an illustration of an example user interface in accordance with the techniques of the disclosure.

FIG. 4 is an illustration of example user interface 400 in accordance with the techniques of the disclosure. User interface 400 may be an example of user interface 150 of FIG. 1 or output device 204 of FIG. 2. For convenience, FIG. 4 is described with respect to computing system 100 of FIG. 1.

User interface 400 depicts window element 402 for displaying actions that may be perceived as unexpected by a user, window element 406 for displaying a context for the action that may be perceived as unexpected by the user, and window element 404 for displaying a rationale for the decision. In the example of FIG. 4, autonomous system 120 is an autonomous vehicle planning a route to a target destination. Reflection unit 110 has identified, as described above, that the route that autonomous system 120 has selected to the destination is different from a historical route taken to the destination. User interface 400 presents, via window element 402, the unexpected action identified by reflection unit 110.

Further, explanation management unit 102 identifies, as described above, a context and a rationale for the action that may be perceived as unexpected by the user. In the example of FIG. 4, explanation management unit 102 determines that autonomous system 120 is configured to select an optimal route to a destination, and in this case, autonomous system 120 has defined the optimal route to be the route that requires the least amount of time to reach the destination. Explanation management unit 102 further determines that the historical route taken by autonomous system 120 to the destination has historically been selected as the route that requires the least amount of time to reach the destination. However, explanation management unit 102 further determines that autonomous system 120 has identified a distant traffic accident along the historical route that is causing significant delay along the historical route. Accordingly, autonomous system 120 has determined that the alternate route is currently the optimal route to the destination. User interface 400 presents, via window element 404, the rationale of autonomous system 120 for the decision, e.g., that the alternate route is faster than the historical route. Further, user interface 400 presents, via window element 406, a context for the decision, e.g., that a traffic accident causing delays along the historical route has made the alternate route the current optimal route.

In some examples, user interface 400 may have different configurations for presenting information to the user. For example, instead of window elements 402, 404, and 406, user interface 400 may present information via audio, video, images, or text. In some examples, user interface 400 may further include one or more input devices for receiving an input from the user approving or overruling the decision made by autonomous system 120.

Figure 5:
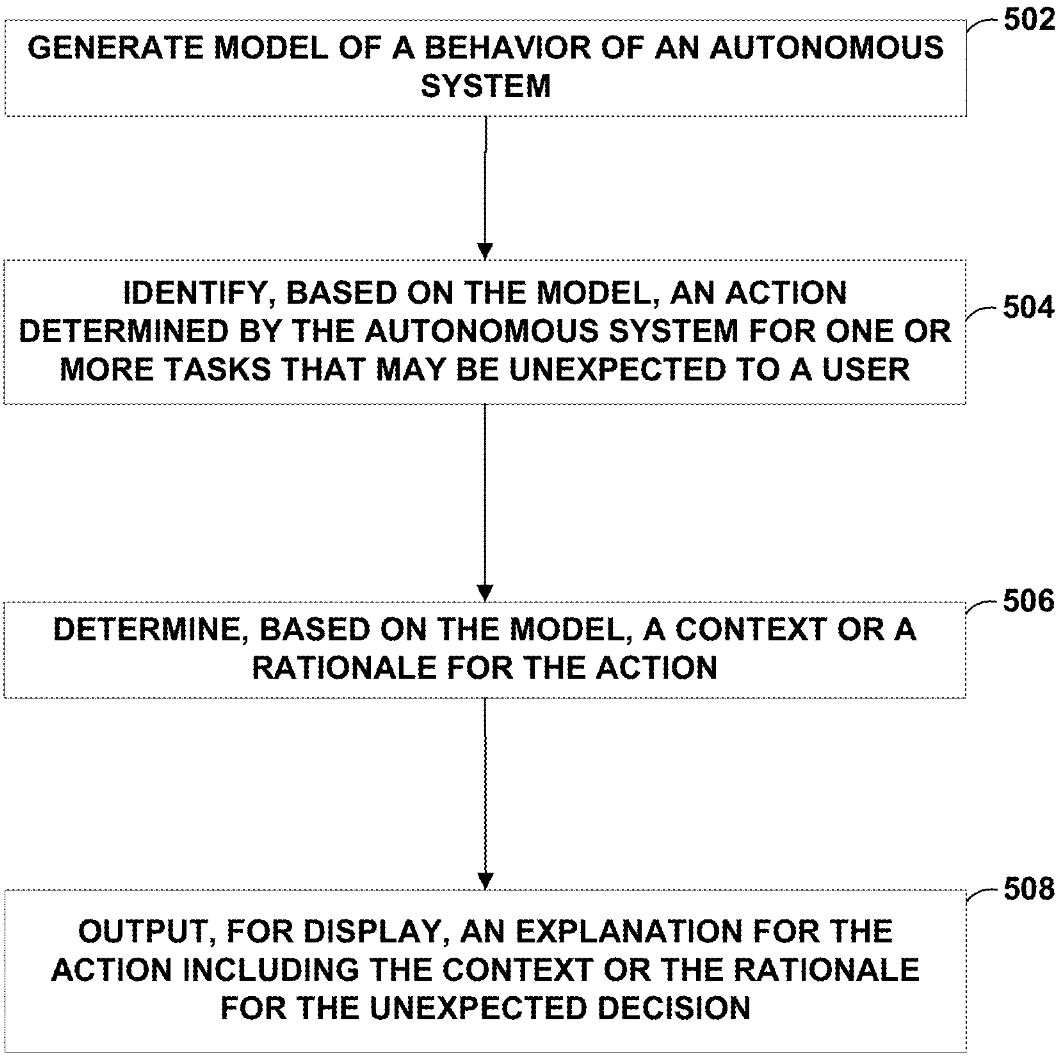
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to computing system 100 of FIG. 1. However, the operation of FIG. 5 may be performed by other systems implementing the techniques of the disclosure, such as the computing system 200 of FIG. 2.

In the example of FIG. 5, reflective unit 110 of computing system 100 generates model 116 of a behavior of autonomous system 120 (502). Explanation management unit 102 identifies, based on model 116, an action determined by autonomous system 120 for a task that may be perceived as unexpected by the user (504). For example, explanation management unit 102 may use model 116 to identify decisions that are historical deviations from past decisions, decisions that arise as a result of unusual situations, decisions that may involve limitations on human knowledge, decisions that violate user preferences, decisions that arise due to multiple choices that have indistinguishable effects, decisions that result in a deviation from a plan, or decisions that result in indirect trajectories to a goal.

Explanation management unit 102 determines, based on model 116, a context or a rationale for the unexpected action (506). The decision context may include information that provides a context for the unexpected action made by autonomous system 120. For example, the decision context may include a summary of information known to autonomous system 120 and used to arrive at the action that may be perceived as unexpected by the user. The decision context may include information related to an operational status of autonomous system 120, a fuel or power status of autonomous system 120, environmental or geographic information, such as terrain obstacles near or remote to autonomous system 120 or routes to a destination, or information related to a target, such as capabilities, location, vector, or defenses of the target.

The decision rationale may include information that explains the reasoning that autonomous system 120 used to arrive at the action that may be perceived as unexpected by the user. For example, the decision rationale may include rules, guidelines, directives, requirements, and/or user preferences, as well as route planning, role allocation, and task optimization criteria that, given action context 112, caused autonomous system 120 to arrive at the action that may be perceived as unexpected by the user.

Explanation management unit 102 uses explanation generation unit 108 and dialog management unit 106 to craft an explanation of the unexpected action for display to the user. Explanation management unit outputs, for display via user interface 150, the explanation for the action that may be perceived as unexpected by the user (508). In some examples, the explanation includes the context or the rationale for the action that may be perceived as unexpected by the user. For example, user interface 400 may present the explanation via an audio message, a video, one or more image, or via text.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system for improving collaboration with a user of an autonomous system by identifying actions of the autonomous system that are unexpected to the user, the system comprising:
- processing circuitry;
- the autonomous system executing on the processing circuitry and configured to:
  - interact with the user;
  - determine actions of the autonomous system for one or more tasks;
  - track previous tasks that were adopted, modified, or dropped by the autonomous system;
  - store data that indicates a rationale for the autonomous system having adopted, modified, or dropped each task of the previous tasks; and
  - store plays that indicate a strategy for achieving each task of the previous tasks;
- a self-reflection unit executing on the processing circuitry and configured to generate a model of a behavior of the autonomous system based on the stored tracked previous tasks, the stored plays, and the stored data, wherein the model is configured to expose decision making of the autonomous system; and
- an explanation unit executing on the processing circuitry and configured to identify, based on the model, one or more actions of the actions of the autonomous system for the one or more tasks that result from one or more of:
  - a deviation from one or more previous actions for the one or more tasks, or
  - a selection, by the autonomous system, of at least two decisions that have indistinguishable optimizations,
- wherein the explanation unit is further configured to determine, based on the model, a context for the one or more actions and a rationale for the one or more actions, the context including information known to the autonomous system and used to determine the one or more actions, the rationale including information explaining reasoning used by the autonomous system to determine the one or more actions, wherein the explanation unit comprises a set of one or more classifiers configured to process the one or more actions, the context for the one or more actions, and the rationale for the one or more actions to output a probability the one or more actions are unexpected to the user, and wherein the explanation unit is further configured to output, for display, based on the probability the one or more actions are unexpected to the user exceeding a threshold, an explanation for the one or more actions comprising the context and the rationale for the one or more actions and output one or more of an acknowledgement of the deviation, or an explanation that the at least two decisions have indistinguishable optimizations, to improve collaboration with the user of the autonomous system.

2. The system of claim 1, wherein to identify the one or more actions, the explanation unit is further configured to determine that the one or more actions result from limitations on human knowledge.

3. The system of claim 1, wherein to identify the one or more actions, the explanation unit is further configured to determine that the one or more actions are a deviation from a predetermined plan, and wherein, to output the explanation for the one or more actions, the explanation unit is further configured to output an acknowledgement of the deviation from the predetermined plan and a rationale for the deviation from the predetermined plan.

4. The system of claim 1, wherein to identify the one or more actions, the explanation unit is further configured to determine that the one or more actions are a decision to travel along an indirect trajectory to a target destination, and wherein, to output the explanation for the one or more actions, the explanation unit is further configured to output an acknowledgement of the decision to travel along the indirect trajectory and a rationale for the decision to travel along the indirect trajectory.

5. The system of claim 1, further comprising:

a user input device configured to receive, in response to outputting the explanation, a user input, wherein the autonomous system is configured to change, in response to the user input, the one or more actions for the one or more tasks.

6. The system of claim 1, wherein the explanation unit is configured to determine that the one or more actions result from the deviation from one or more previous actions for the one or more tasks, and the explanation unit is further configured to output the acknowledgement of the deviation.

7. The system of claim 1, wherein the explanation unit is configured to determine that the one or more actions result from the selection, by the autonomous system, of the at least two decisions that have indistinguishable optimizations, and the explanation unit is further configured to output the explanation that the at least two decisions have indistinguishable optimizations.

8. A method for improving collaboration with a user of an autonomous system by identifying actions of the autonomous system that are unexpected to the user, the method comprising:

determining, by an autonomous system executing on processing circuitry and configured to interact with the user, actions of the autonomous system for one or more tasks;

tracking, by the autonomous system, previous tasks that were adopted, modified, or dropped by the autonomous system;

storing, by the autonomous system, data that indicates a rationale for the autonomous system having adopted, modified, or dropped each task of the previous tasks;

storing, by the autonomous system, plays that indicate a respective strategy for achieving each task of the previous tasks;

generating, by a self-reflection unit executing on the processing circuitry, a model of a behavior of the autonomous system based on the stored tracked previous tasks, the stored plays, and the stored data, wherein the model is configured to expose decision making of the autonomous system;

identifying, by an explanation unit executing on the processing circuitry and based on the model, one or more actions of the actions of the autonomous system for the one or more tasks;

determining that the one or more actions result from one or more of:

a deviation from one or more previous actions for the one or more tasks, or a selection, by the autonomous system, of at least two decisions that have indistinguishable optimizations;

determining, by the explanation unit and based on the model, a context for the one or more actions and a rationale for the one or more actions, the context including information known to the autonomous system and used to determine the one or more actions, the rationale including information explaining reasoning used by the autonomous system to determine the one or more actions;

processing, by a set of one or more classifiers of the explanation unit, the one or more actions, the context for the one or more actions, and the rationale for the one or more actions to output a probability the one or more actions are unexpected to the user; and outputting, by the explanation unit and for display, based on the probability the one or more actions are unexpected to the user exceeding a threshold, an explanation for the one or more actions comprising the context and the rationale for the one or more actions and outputting one or more of an acknowledgement of the deviation, or an explanation that the at least two decisions have indistinguishable optimizations, to improve collaboration with the user of the autonomous system.

9. The method of claim 8, wherein identifying the one or more actions further comprises determining that the one or more actions result from limitations on human knowledge.

10. A non-transitory, computer-readable medium comprising instructions, that, when executed, cause processing circuitry of a system to:

determine actions of an autonomous system for one or more tasks;

track, previous tasks that were adopted, modified, or dropped by the autonomous system;

store data that indicates a rationale for the autonomous system having adopted, modified, or dropped each task of the previous tasks;

store plays that indicate a respective strategy for achieving each task of the previous tasks;

generate a model of a behavior of the autonomous system based on the tracked previous tasks, the stored plays, and the stored data, wherein the model is configured to expose decision making of the autonomous system;

identify, based on the model, one or more actions of the actions of the autonomous system for the one or more tasks;

determine that the one or more actions result from one or more of:

a deviation from one or more previous actions for the one or more tasks, or a selection, by the autonomous system, of at least two decisions that have indistinguishable optimizations;

determine, based on the model, a context for the one or more actions and a rationale for the one or more actions, the context including information known to the autonomous system and used to determine the one or more actions, the rationale including information explaining reasoning used by the autonomous system to determine the one or more actions;

process, by a set of one or more classifiers, the one or more actions, the context for the one or more actions, and the rationale for the one or more actions to output a probability the one or more actions are unexpected to the user; and output, for display, based on the probability the one or more actions are unexpected to the user exceeding a threshold, an explanation for the one or more actions comprising the context and the rationale for the one or more actions and output one or more of an acknowledgement of the deviation, or an explanation that the at least two decisions have indistinguishable optimizations, to improve collaboration with the user of the autonomous system.

* * * * *